C. CAPSONI.
APPARATUS FOR PRODUCING OSCILLATORY MOVEMENTS
APPLICATION FILED JUNE 19, 1921

1,388,097.   Patented Aug. 16, 1921.

Inventor:
Carlo Capsoni
By _____
Attorney.

UNITED STATES PATENT OFFICE.

CARLO CAPSONI, OF ALESSANDRIA, ITALY.

APPARATUS FOR PRODUCING OSCILLATORY MOVEMENTS.

1,388,097.   Specification of Letters Patent.   Patented Aug. 16, 1921.

Application filed June 19, 1920. Serial No. 390,235.

*To all whom it may concern:*

Be it known that I, CARLO CAPSONI, a subject of the King of Italy, residing at Alessandria, Kingdom of Italy, have invented certain new and useful Improvements in Apparatus for Producing Oscillatory Movements, (for which I have filed an application in Italy, April 29, 1919,) of which the following is a specification.

In industrial proceedings it is often necessary to shake materials so as to obtain a good settling in a form, or for sieving, etc.

If an apparatus designed to produce oscillating or shaking movements is to be usefully employed in industry, it should be possible to easily control the amplitude, direction and frequency of the movement according to the different materials and operations. Moreover, such an apparatus should be mechanically simple, strong and durable so as to resist the violent and continuous action of the shaking movements.

Figure 1:
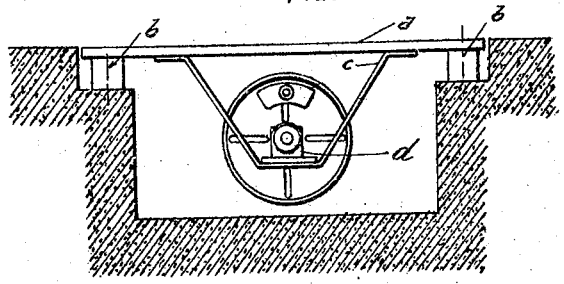
Figure 2:
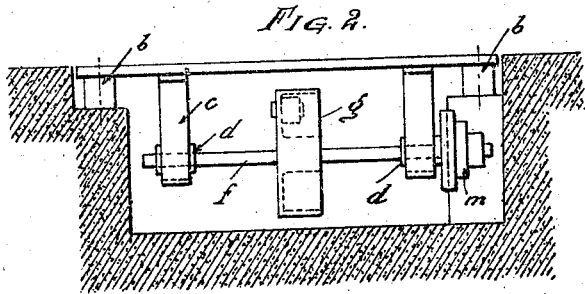
Figure 3:
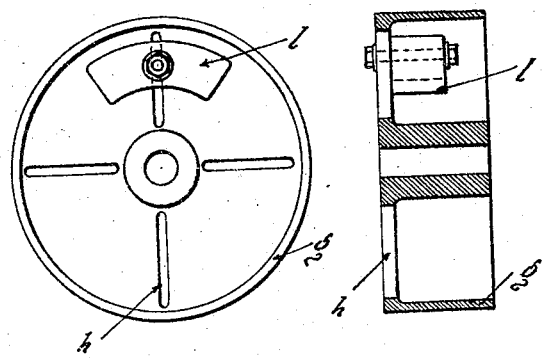

One form of the invention as an example, is illustrated in the accompanying drawing in which Figure 1 is an elevation of the invention in use; Fig. 2 is an end elevation of the same; and Fig. 3 showing in elevation and transverse section the means for varying the characteristic of the movement.

A platform $a$, which is rigid throughout, rests on four or more elastic supports $b$, which may be either rubber plates or springs, or any other suitable elastic devices provided that they are capable of being easily substituted, so as to vary their elasticity and to obtain oscillations of variable amplitude as required, and provided they yield in all directions.

On the lower surface or on the upper, if convenient, of the platform $a$ are fixed two hanging supports $c$ with bearings $d$, which carry a shaft $f$ placed in a determined direction in respect to the axis of the platform.

The shaft $f$ carries, in a determined position in respect to the platform, a pulley $g$ of a radius less than the distance between the shaft and the lower surface of the platform, so that the pulley in its rotation around the shaft does not touch the platform. The pulley $g$ has some radial slots $h$ in one or more of which it is possible, with the aid of bolts or other means, to fix one or more heavy masses $l$. By displacing the fixing bolts of the latter radially in the slots $h$, it is possible to vary as required the eccentricity of the masses $l$.

The shaft $f$ is rotated by the pulley $m$ which has different diameters driven by a belt. Any other mechanical means for rotating the shaft $f$ may be used.

During the rotation of the shaft $f$ and of the pulley $g$ with its eccentric masses $l$, in consequence of the inertia of the latter, the whole device (constituted by the platform, supports, bearing, shaft and pulley) will receive at every instant an impulse in the plane in which, at that instant is located the center of gravity of the masses $l$.

At each instant such impulses, which continually vary in direction following the rotation of the shaft $f$, combine with the elastic deformations of the elastic supports $b$ on which the whole device rests, and whose oscillation period does not generally coincide with that of the rotating masses $l$. The instantaneous combination of the two oscillating movements produces an intense shaking movement in the whole system, which movement is naturally transmitted to the materials laid on the platform. The resulting movement follows a complex law, and depends on a great quantity of variables which is not easy to value. The practical use of the apparatus shows however that the movement is regulatable in ample limits simply by the variation of one or more of the following factors:

1. The rotating speed of shaft $f$.
2. The weight of the eccentric masses $l$.
3. The eccentricity of these masses $l$ form the axis of the shaft $f$.
4. The elasticity of the supports $b$.

The variability of the speed of the shaft $f$ may be easily obtained by any of the means which are known in mechanics. The eccentricity of the masses $l$, may be varied by shifting the same radially along the slots $h$, while their weight may be varied either by changing the masses, or by partially compensating them with other masses placed in the opposite direction.

The variation of the elasticity of the supports $b$, may be obtained by changing them, or by limiting their deformations by any of the means known in practice.

Maintaining all the other factors constant, and simply by gradually increasing the rotating speed of the shaft $f$, it is possible to obtain, first an oscillating movement in a horizontal plane, then in an inclined plane of any desired inclination, then in a vertical plane, and finally for a certain value of the speed the stopping of all movements. This is due to a phenomena of interference between the various oscillating movements which constitute the resulting oscillations.

Other variations of less importance may be obtained, either by displacing the pulley $g$ with its masses $l$ on the shaft $f$ so as to obtain oscillations of different amplitude and direction in the part of the platform nearer to the pulley in comparison with the other part, or by displacing the position of the shaft by respect to the platform.

Generally, however, it is necessary to have equal oscillations on the various points of the platform, and then the shaft is placed in the direction of one of the axes of the former, generally along the longer axis, and the pulley $g$ is placed under the center of the platform, with a slight displacement toward the pulley $m$, so as to counter balance the effect of the belt tension, which if too stretched is likely to influence the independence of movement of the system. Such a displacement however is not generally necessary if the belt is sufficiently long and not too stretched. When other means than the belt are used, naturally the displacement is not necessary.

Finally, in special cases, where owing to the dimensions of the platform or for other reasons, a single pulley $g$ would not be sufficient, two or more pulleys may be placed on the same shaft, or two or more shafts may be connected with the same platform.

In such a case, besides the regulating means specified above, it will be possible to meet all requirements, by varying the positions of the unbalancing masses or weights on the different pulleys, or their eccentricity or their angular displacement. Also the different shafts may be rotated at variable speeds.

Claims:

1. In an apparatus for shaking material, the combination of a platform, rigid throughout, adapted to carry the material; resilient members on which said platform immediately rests and solely by which it is supported, said resilient members adapted to yield in every direction; and platform-vibrating means rigidly secured to said platform.

2. In an apparatus for shaking material, the combination of a platform, rigid throughout, adapted to carry the material; resilient supports for said platform adapted to yield in every direction; a shaft rigidly mounted on said platform; a disk mounted on said shaft having its normal center of gravity substantially coincident with the axis of said shaft, said disk having at least one radial slot provided therein; an unbalancing weight adjustably engaged in said slot to permit its attachment to said disk at the desired radial distance from the axis of said shaft, and means for rotating said shaft to cause vibration of the platform and agitation of the material carried thereby due to the eccentricity of said weight.

In testimony whereof I affix my signature.

Ing. CARLO CAPSONI.